United States Patent
Du et al.

(10) Patent No.: US 12,082,530 B2
(45) Date of Patent: Sep. 10, 2024

(54) BIOFILTRATION SYSTEM FOR HARVESTING MICROALGAE AND RELATED METHODS

(71) Applicant: BOARD OF TRUSTEES OF MICHIGAN STATE UNIVERSITY, East Lansing, MI (US)

(72) Inventors: Zhi-Yan Du, Honolulu, HI (US); Muhammad Fadzlan Bin Kamarudzaman, East Lansing, MI (US); Warren Purvin, East Lansing, MI (US); Spencer Rinke, East Lansing, MI (US); Tomo Max Saito, East Lansing, MI (US); Chad Winner, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 950 days.

(21) Appl. No.: 17/111,922

(22) Filed: Dec. 4, 2020

(65) Prior Publication Data
US 2021/0169005 A1  Jun. 10, 2021

Related U.S. Application Data

(60) Provisional application No. 62/944,088, filed on Dec. 5, 2019.

(51) Int. Cl.
| | |
|---|---|
| *A01D 44/00* | (2006.01) |
| *C02F 1/00* | (2023.01) |
| *C02F 3/06* | (2023.01) |
| *C02F 3/34* | (2023.01) |
| *C02F 103/00* | (2006.01) |

(52) U.S. Cl.
CPC .............. *A01D 44/00* (2013.01); *C02F 1/001* (2013.01); *C02F 3/06* (2013.01); *C02F 3/347* (2013.01); *C02F 2103/007* (2013.01); *C02F 2203/006* (2013.01)

(58) Field of Classification Search
CPC ...................................................... A01D 44/00
See application file for complete search history.

(56) References Cited

U.S. PATENT DOCUMENTS

| | | | | |
|---|---|---|---|---|
| 5,032,261 A | * | 7/1991 | Pyper | C02F 3/103 210/281 |
| 2008/0264858 A1 | * | 10/2008 | Stamets | A01N 63/30 47/57.6 |
| 2018/0346954 A1 | | 12/2018 | Bonito et al. | |

OTHER PUBLICATIONS

Rinke et al., Final Progress Report for "Non-Clogging Fungal Filter for Harvesting Microalgae," presented at Michigan State University College of Engineering Design Day (Dec. 5, 2019).

* cited by examiner

*Primary Examiner* — Albert M Navarro
(74) *Attorney, Agent, or Firm* — MARSHALL, GERSTEIN & BORUN LLP

(57) ABSTRACT

The disclosure relates to a filtration system for harvesting microalgae. The filtration system includes a filter housing with modular filtration units each containing a fungal filter. The fungal filter includes a perforated support with a capture fungus on the support. The fungal filter is adapted to be removed and replaced from the modular filtration unit, for example during operation of the filtration system. The capture fungus is adapted to capture one or more types of microalgae upon contact of the capture fungus with the microalgae, for example via fungal mycelium. During use of the filtration system to treat an influent stream containing microalgae, microalgae are captured and coated on the fungal filters. The coated fungal filters can be easily removed and the microalgae is harvested directly from the perforated support. New replacement filters can be inserted into the filtration system for continuous operation.

19 Claims, 8 Drawing Sheets

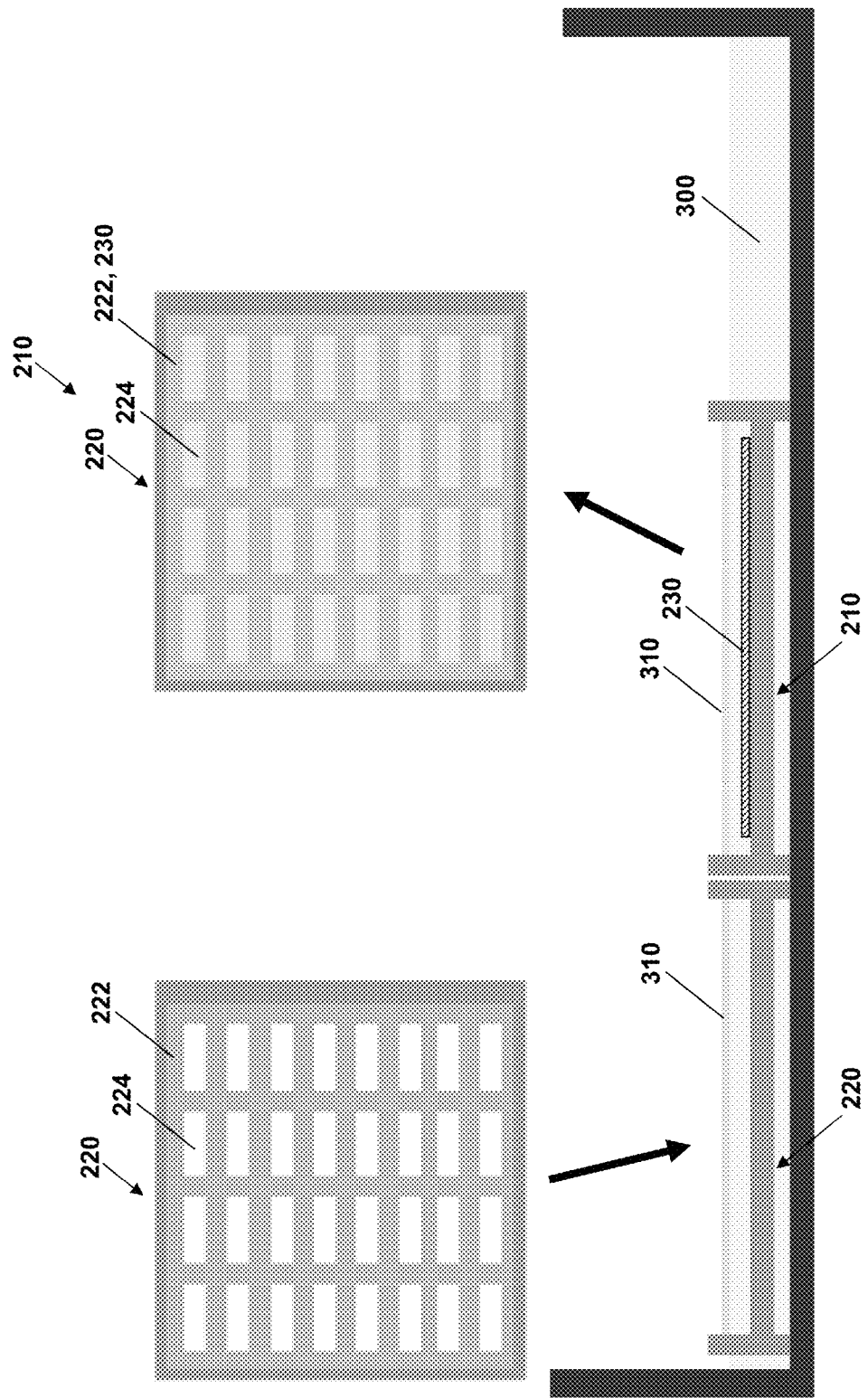

BIOFILTRATION SYSTEM FOR HARVESTING MICROALGAE AND RELATED METHODS

CROSS REFERENCE TO RELATED APPLICATION

Priority is claimed to U.S. Provisional Application No. 62/944,088 (filed Dec. 5, 2019), which is incorporated herein by reference in its entirety.

STATEMENT OF GOVERNMENT INTEREST

None.

BACKGROUND OF THE DISCLOSURE

Field of the Disclosure

The disclosure relates to a filtration system for harvesting microalgae. The filtration system includes a filter housing with modular filtration units containing a fungal filter. The fungal filter includes a perforated support with a capture fungus on the support. The fungal filter is adapted to be removed and replaced from the modular filtration unit. The capture fungus is adapted to capture one or more types of microalgae upon contact of the capture fungus with the microalgae, for example via fungal mycelium.

Brief Description of Related Technology

Algae are photosynthetic aquatic organisms that are diverse and possess little to no tissue differentiation. Microalgae are a subset of algae which range from several to a few hundred micrometers. There are species adapted to living in freshwater, and others adapted to brackish or marine environments. Microalgae can grow in extreme environments such as deserts and polar regions, and often show greater efficiency in synthesizing bioproducts compared to land plants. Moreover, microalgae produce oxygen and sequester the greenhouse gas carbon dioxide at global scales, accounting for over half of the carbon fixation that occurs in oceans. In addition to having fast growth, they can produce high-value biomass composed of proteins (40%-60%), lipids (5%-60%), and carbohydrates (8%-30%), making them ideal supplies for food and nutrition. Algal protein is complete with all the essential amino acids.

The unicellular structure of microalgae allows them to easily convert sunlight into chemical energy. Many microalgae have the ability to survive in the most extreme environments, allowing microalgae incubation in harsh environments such as deserts, coastal areas, islands, and urban centers. However, in contrast to the simple growth system, harvesting microalgae is challenging due to their small cell size (typically 2-20 μm) and relatively low density (0.3-5 g/L). Harvesting microalgae is a major cost of derived products. For example, harvesting raceway pond systems with chemical flocculation or the use of industrial-scale centrifuge instruments are both very expensive. Current methods for harvesting microalgae are limited by high cost, introducing contamination and pollution, and high demand for instrument and maintenance. Thus, an economical and environment-friendly method to harvest microalgae is needed to meet the demand for increasing the algae market.

Several species of *Mortierella* fungi are able to capture *Nannochloropsis oceanica* with high-efficiency. This marine alga has a high oil yield and makes valuable omega-3 fatty acid EPA. *Mortierella* fungi are common and widespread in soils, but they are also industrial fungi used in human supplements owing to their high lipid content. *Mortierella* are non-pathogenic to plants, animals, and humans. *Mortierella* fungi are easy to cultivate as they utilize simple sugars and grow rapidly. They can even be grown utilizing food or brewery wastewater effluents. *Mortierella* fungi can form thick biofilms that can float in liquid culture. *Mortierella* fungi make high amounts of oil that are enriched in ARA, an omega-6 polyunsaturated fatty acid that is beneficial for heart health and systemic inflammation.

SUMMARY

In one aspect, the disclosure relates to a microalgae filtration system comprising: a filter housing having an inlet and an outlet, and comprising a plurality of modular filtration units defining a continuous fluid flow path from the inlet, through the modular filtration units, and to the outlet. Each modular filtration unit comprises a fungal filter comprising (i) a perforated support (e.g., mesh plate) having a solid surface and defining an open area, and (ii) a (living) capture fungus on the solid surface of the perforated support (e.g., adhered thereto). The fungal filter is adapted to be removed and replaced from the modular filtration unit, for example during operation of the filtration system or during an intermittent shutdown of the filtration system. The continuous fluid flow path passes through the fungal filter, for example the perforated support open area. Thus, the inlet and outlet are in fluid communication through the fungal filters. The capture fungus is adapted to capture one or more types of microalgae upon contact of the capture fungus with the microalgae, for example via fungal mycelium.

Various refinements of the disclosed microalgae filtration system are possible.

In a refinement, the fungal filter is removably engaged (e.g., slidably engaged) with the modular filtration unit from an external region of the filter housing. For example, a filter housing can include a plurality of externally accessible slots or other orifices for insertion/installation of a new/fresh fungal filter and removal of a used/coated fungal filter after accumulation of microalgae.

In a refinement, the modular filtration unit comprises a modular housing unit defining a portion of the filter housing and containing the fungal filter. The modular filtration units can be removably connectable and disconnectable to each other by any suitable means, for example threaded connectors, latch connectors, pin or screw connectors, etc. Such removable connections allow for temporary disassembly of a portion of the filter housing to permit removal and replacement of the fungal filter. The removable connections also allow the filtration system to be assembled with any desired number of modular filtration units, for example where a higher or lower number of filtration stages are desired based on the nature of the filter feed stream (e.g., concentration and/or type of microalgae in feed).

In a refinement, the perforated support comprises a mesh plate. The perforated support generally can include any solid material with a series of holes, orifices, gaps, etc. to provide fluid flow therethough. Such open areas can be sized to provide relatively little or some resistance to fluid flow. The open areas are preferably large enough to prevent filter clogging during operation, but they can be sized to control the retention time of fluid in filtration system.

In a refinement, the perforated support has a ratio of open area to closed (solid surface) area in a range of 20:80 to 80:20. The area is generally defined in a plane perpendicular to the direction of fluid flow through the perforated support, for example in a direction normal to the plate or other major surface of the support. Thus, about 20-80% (e.g., at least 20, 30, 40, or 50% and/or up to 50, 60, 70, or 80%) of the surface area of the perforated support is open and available for fluid flow therethrough. Correspondingly, about 20-80% (e.g., at least 20, 30, 40, or 50% and/or up to 50, 60, 70, or 80%) of the surface area of the perforated support is the solid surface upon which the capture fungus can grow and adhere. Thus, the fractional solid surface area of the support is desirably high to provide a higher capture capacity for microalgae, and it is balanced with open area to allow sufficient fluid throughput through the fungal filter.

As a non-limiting example, perforated supports or mesh plates can be formed with circular holes having a diameter of about 6.35 mm (or area of about 32 mm$^2$) with a nominal spacing of about 12.7 mm between holes to provide good balance between fungal growth/capture surface and fluid flow area through the filter. The overall area/diameter of the support/plate can be scaled to the filtration unit and desired throughput. The thickness of the support/plate is suitably large enough to support the load in the filtration unit and to prevent deformation or breaking of the support/plate during heat treatment, for example after filter removal to harvest algae and before being placed back into the system.

In a refinement, the perforated support comprises a material selected from the group consisting of plastics, metals, and combinations thereof. Any solid materials are generally suitable, as the capture fungus is generally capable of attaching/adhering to most solid surfaces during fungal filter formation/growth. Plastics such as polycarbonate, polylactic acid, polyvinyl chloride, polyolefins, and other thermoplastic or thermoset materials can be desirable for cost and ease of manufacturing considerations (e.g., via 3D printing). Metals such as stainless steel can be desirable for strength, longevity, and reusability considerations.

In a refinement, the capture fungus comprises a *Mortierella* fungus. *Mortierella* species are widespread soil fungi and they are safe to plants or animals and humans. Many *Mortierella* strains are used for human nutraceuticals because of their outstanding productivity in polyunsaturated fatty acids. *Mortierella* fungi form dense biofilms along culture surfaces, and being indeterminate in growth form, can grow into the size and shape of their incubation container to make standard size fungal filters.

In a refinement, the microalgae capable of being captured upon contact with the capture fungus are selected from the group consisting of *Nannochloropsis, Chlorella, Chlamydomonas*, and combinations thereof.

In another aspect, the disclosure relates to a method for harvesting microalgae, the method comprising: providing a filtration system according to any of the various disclosed embodiments; feeding an influent comprising microalgae to the inlet of the filter housing; capturing microalgae on one or more fungal filters in the filter housing, thereby forming one or more coated fungal filters comprising (i) the perforated support, (ii) the capture fungus thereon, and (iii) microalgae bound to the capture fungus; withdrawing an effluent from the outlet of the filter housing, the effluent containing less microalgae than the influent; and removing one or more coated fungal filters from the filtration system and harvesting the microalgae therefrom. For example, the collective biomass on the coated filter can be scraped or otherwise mechanically removed from the support. The harvested biomass can be used as mixture of fungus and algae. For example, combined with oil-producing microalgae, the algae-fungi feedstocks harvested from the fungal filters could be processed simultaneously for food, nutraceutical, and animal feed markets.

Various refinements of the disclosed method for harvesting microalgae are possible.

In a refinement, the method further comprises replacing the removed coated fungal filters with fresh fungal filters, for example with a new/different support having a newly grown capture fungus thereon which is suitably free from microalgae. Removing and replacing can be performed while the filtration system is in operation or while the system is temporarily halted (e.g., valve shut-off to halt influent flow when changing filters).

In a refinement, the method comprises performing feeding the influent, capturing the microalgae, and withdrawing the effluent as continuous process operations.

In a refinement, at least 70% of the microalgae in the influent is captured on the fungal filters. For example, at least 70, 80, 90, or 95% and/or up to 90, 95, 98, 99, or 100% of the microalgae is captured. Alternatively or additionally, the concentration of microalgae in the effluent can be 30% or less than that in the influent (e.g., at least 1, 2, 5, or 10% and/or up to 5, 10, 20, or 30%).

In a refinement, the influent is a bioreactor product stream, for example a bioreactor operated to grow microalgae specifically for subsequent harvest.

In a refinement, the influent is from a natural body of water, for example a pond or lake where microalgae are present.

In a refinement, the method comprises feeding the influent and withdrawing the effluent via gravity. Gravity can be a sufficient driving force for flow through the filter housing (i.e., with the inlet at a higher relative elevation than the outlet), in particular because large velocities are not required for effective operation of the filtration system. Lower velocities can promote extended contact time and capture efficiency between the influent and the capture fungus, and they also limit fluid shearing forces that can detach or otherwise damage a capture fungus attached to its support. Nonetheless, in some embodiments, positive pressure or a suction pressure (e.g., via a pump or otherwise) can be used to assist flow through the filtration system, in particular if care is taken to limit or prevent damage to the capture fungus.

While the disclosed apparatus, systems, compositions, articles, and methods, are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein:

FIG. 9 illustrates a process for growing/binding a capture fungus on a perforated support to form a corresponding fungal filter according to the disclosure.

DETAILED DESCRIPTION

Figure 1:
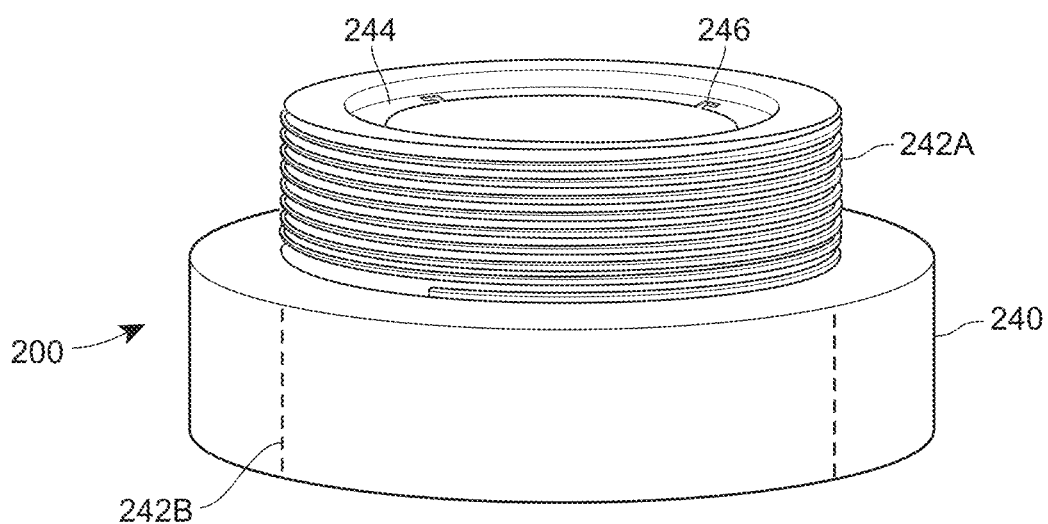
FIG. 1 illustrates an embodiment of a modular filtration unit according to the disclosure.

The disclosure relates to microalgae filtration system using fungal filters. The system components can be formed from safe and durable plastic materials, for example polycarbonate, silicon-based materials, polylactic acid, and other thermoplastic or thermoset materials. The system can be used to harvest microalgae from any suitable source in a continuous manner. The system incorporates a pod-type or modular arrangement which allows for any desired number of filtration units as well as easy removal and replacement of fungal filters in a filtration unit after the algae have been collected on the surface of the fungi/fungal filter, for example while maintaining continuous operation of the system.

The fungal filter can be formed by placing a perforated support (e.g., mesh plate) in a liquid or other culture medium containing a capture fungus of interest, for example *Mortierella* fungi. The fungal filters typically take about 2-7 days to grow, for example based on the size of the filter and/or the fungal strain used, during which time the capture fungus grows in the form of a living fungal biofilm adhered to the perforated support. Once formed, the fungal filters can remain active and alive several weeks (e.g., at least 10, 15, or 20 days and/or up to 20, 30, 40, or 50 days), during which time the fungal biofilm remains living and is able to effect specific capture interactions between its fungal mycelium and various target microalgae. The fungal filters are suitably used in the filtration system during this activity period of the living fungal biofilm, for example being inserted as a fresh fungal filter (e.g., a microalgae-free filter as originally formed) and/or being withdrawn as a coated fungal filter (e.g., a filter with microalgae adsorbed or otherwise captured on the fungal biofilm) while the fungal biofilm is alive.

As discussed above, harvesting microalgae is very difficult and expensive because they are so small, typically about 2-20 microns in size. The microalgae filtration system facilitates harvesting of microalgae with a simple capture and recovery process. Fungal filters that have been operating in the filtration system for a period accumulate captured microalgae thereon. Such coated fungal filters can be easily removed from filtration system due to its pod-type or modular design, and a new, fresh fungal filter can be inserted to maintain essentially continuous operation. Biomass on the coated fungal filters includes both the capture fungus coated thereon as well as the microalgae captured by the fungus during operation. This biomass can be recovered, for example by scraping or other mechanical means. The perforated support can be reused, for example by sterilization (e.g., in an autoclave) followed by growing a new living fungal biofilm thereon. Thus the filtration system can be used to harvest microalgae in a very safe, cheap, and environmentally friendly way. The microalgae that are harvested can be used for any of a variety of downstream uses, for example as an animal food and/or a source of renewable energy, due to their high content of protein, oil, and carbohydrates.

FIGS. 1-9 generally illustrate apparatus and methods according to the disclosure, including a microalgae filtration system 10 and related methods for harvesting microalgae using the filtration system 10. The microalgae filtration system 10 includes a filter housing 100 having an inlet 110 and an outlet 120. The filter housing 100 defines an internal volume V through which microalgae-containing fluid (e.g., an aqueous medium) flows during use of the filtration system 10. The filtration system 10 further includes a plurality of modular filtration units 200 to bind, capture, and remove microalgae from an influent feed stream 20 introduced via the inlet 110 and passing through the internal volume V to provide an effluent product stream 30 with reduced microalgae content (e.g., relative to the influent microalgae content) via the outlet 120. The filtration system 10 and modular filtration units 200 together collectively define a continuous fluid flow path 130 from the inlet 110, through the modular filtration units 200, and to the outlet 130. The continuous fluid flow path 130 generally passes through the internal volume V of the filter housing 100 and across individual filtration units 200 (e.g., via open areas 224 in individual fungal filters 210 as described below). Thus, the inlet 110 and outlet 120 are in fluid communication via the internal volume V of the filter housing 100 and the filtration units 200 (or fungal filters 210 thereof). The filter housing 100 can have any suitable structure to permit fluid flow therethrough and support the modular filtration units 200. For example, in some embodiments, the filter housing 100 can have a cabinet or box structure that permits individual filtration units 200 to be slidably or otherwise easily inserted and removed from the filter housing 100 (see FIGS. 3 and 7). In other embodiments, the filter housing 100 can be defined by the plurality of filtration units 200 such that individual filtration units 200 can be added or removed to increase or decrease the internal volume V, or replaced to provide a fresh fungal filter 210 when desired (see FIG. 4).

Each modular filtration unit 200 includes a fungal filter 210. The fungal filter 210 includes a perforated support 220 (e.g., a mesh plate) having a solid surface 222 that defines at least one open area 224, but more typically a plurality of open areas 224 that can have a regular or consistent shape and spacing on the perforated support 220. The perforated support 220 generally can include any solid material with a series of holes, orifices, gaps, etc. to provide fluid flow therethough, for example a mesh plate. Such open areas 224 can be sized to provide relatively little or some resistance to fluid flow. The open areas 224 are preferably large enough to prevent filter 210 clogging during operation, but they can be sized to control the retention time of fluid in filtration system 10. The overall area or diameter of the support 220 can be scaled to the filtration unit 10 and desired throughput. The thickness of the support 220 is suitably large enough to support the load in the filtration unit 10 and to prevent deformation or breaking of the support 220 during heat treatment, for example after filter 210 removal to harvest algae and before being placed back into the system. Any solid materials are generally suitable for forming the perforated support 220, as the capture fungus 230 is generally capable of attaching/adhering to most solid surfaces during fungal filter 210 formation/growth. In various embodiments, the perforated support 220 can include or be formed from a material selected from plastics, metals, and combinations thereof. Plastics such as polycarbonate, polylactic acid, polyvinyl chloride, polyolefins, and other thermoplastic or thermoset materials can be desirable for cost and ease of manufacturing considerations (e.g., via 3D printing or other additive manufacturing). Metals such as stainless steel can be desirable for strength, longevity, and reusability considerations.

As noted above, the number and size of the open areas 224 can be selected to control resistance to fluid flow, prevent filter clogging, control fluid retention time, etc. In an embodiment, the perforated support 220 has a ratio of open area 224 to closed (solid surface 222) area in a range of 20:80 to 80:20. The areas are generally defined in a plane perpendicular to the direction of fluid flow through the perforated support 220, for example in a direction normal to the plate or other major surface of the support 220. Thus, about 20-80% (e.g., at least 20, 30, 40, or 50% and/or up to 50, 60, 70, or 80%) of the surface area of the perforated support 220 is open and available for fluid flow therethrough. Correspondingly, about 20-80% (e.g., at least 20, 30, 40, or 50% and/or up to 50, 60, 70, or 80%) of the surface area of the perforated support 220 is the solid surface 222 upon which the capture fungus 230 can grow and adhere. Thus, the fractional solid surface 222 area of the support 220 is desirably high to provide a higher capture capacity for microalgae, and it is balanced with open area 224 to allow sufficient fluid throughput through the fungal filter 210.

The fungal filter 210 further includes a capture fungus 230 on the solid surface 222 (e.g., adhered thereto) of the perforated support 220, for example having been grown as a living fungus directly on the solid surface 222 in a suitable culture medium 300. The fungus 230 is able to bind or otherwise capture microalgae that it contacts during operation of the filtration system 10, for example via its fungal mycelium. Suitable fungi and corresponding microalgae for capture are described in more detail below. In a particular embodiment, however, the capture fungus 230 includes a *Mortierella* fungus. *Mortierella* species are widespread soil fungi that are safe to plants or animals and humans. *Mortierella* fungi form dense biofilms along culture surfaces, and being indeterminate in growth form, can grow into the size and shape of their incubation container to make standard size fungal filters 210. Many *Mortierella* strains can be used for human nutraceuticals because of their outstanding productivity in polyunsaturated fatty acids. Further, several species of *Mortierella* fungi are able to capture microalgae such as *Nannochloropsis* microalgae (e.g., *Nannochloropsis oceanica*) with high-efficiency. This marine alga has a high oil yield and makes valuable omega-3 fatty acid eicosapentaenoic acid (EPA). Thus, when the capture fungus 230 itself forms a useful bioproduct (e.g., *Mortierella* fungus or otherwise) along with the microalgae (e.g., a *Nannochloropsis* microalgae or otherwise), the collective capture fungus 230-bound microalgae 232 biomass can be harvested or otherwise recovered together from a coated fungal filter 212 after use, and the combined fungus/microalgae biomass can be extracted or otherwise processed to obtain desired bioproducts formed by the fungus 230 and well as the microalgae 232.

The fungal filter 210 is adapted to be removed and replaced from or with the modular filtration unit 200, or from the filter housing 100, for example during operation of the filtration system 10 or during an intermittent shutdown of the filtration system 10.

Figure 3A:
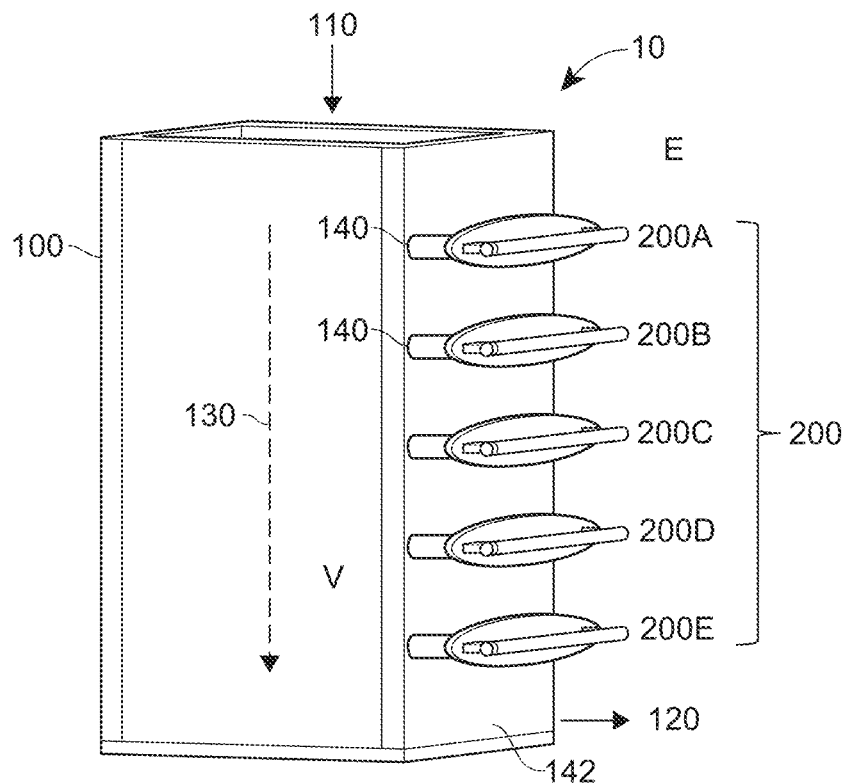
FIG. 3 illustrates an embodiment of a filtration system according to the disclosure, including (A) a filtration housing and (B) a modular filtration unit/fungal filter.
Figure 3B:
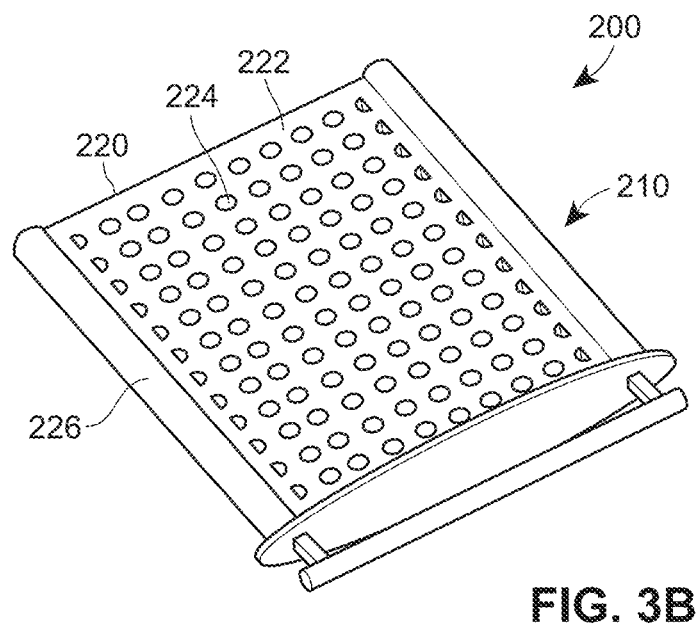
Figure 7:
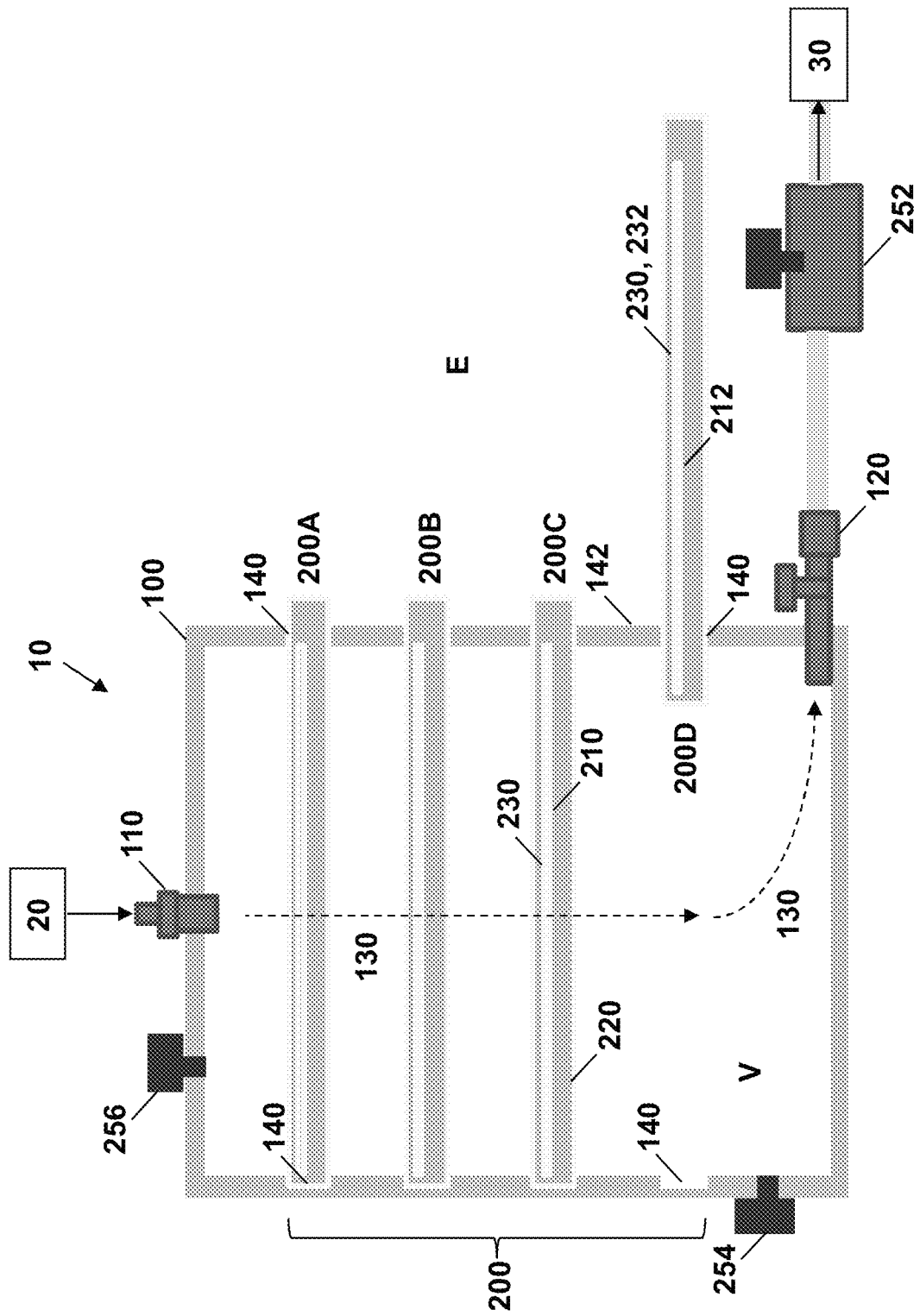
FIG. 7 illustrates an embodiment of a filtration system according to the disclosure.

In embodiments as illustrated in FIGS. 3 and 7 and described in more detail below, the fungal filter 210 is removably engaged (e.g., slidably engaged) with the modular filtration unit 200 from an external region E of the filter housing 100. For example, a filter housing 100 can include a plurality of externally accessible and internal slots 140 or other orifices for insertion/installation of a new/fresh fungal filter 210 and removal of a used/coated fungal filter 212 after accumulation of microalgae 232 bound to the capture fungus 230. Thus, the modular filtration unit 200 can be in the form of a slidable drawer including the fungal filter 210 as a component thereof such that removal a modular filtration unit 200 having a coated fungal filter 212 can be followed by replacement/insertion of a modular filtration unit 200 having a new or fresh (e.g., microalgae-free) fungal filter 210 for continued operation of the filtration system 10.

In embodiments as illustrated in FIGS. 1, 2, and 4-6 and described in more detail below, the modular filtration unit 200 can include a modular housing unit 240 defining a portion of the filter housing 100 and containing the fungal filter 210. The plurality of modular filtration units 200 (e.g., individual modular filtration units 200A, 200B, etc.) can be removably connectable and disconnectable to each other by any suitable means, for example threaded connectors, latch connectors, pin or screw connectors, etc. Such connectors 242 are generally illustrated in the figures as complementary structures 242A, 242B, for example including complementary threaded/screw connections, complementary pin/slot connections, etc. Such removable connections allow for temporary disassembly of a portion of the filter housing 100 to permit removal and replacement of the fungal filter 210. The removable connections also allow the filtration system 10 to be assembled with any desired number of modular filtration units 200, for example where a higher or lower number of filtration stages are desired based on the nature of the filter feed stream (e.g., concentration and/or type of microalgae in feed).

The disclosure further relates to a method for harvesting microalgae using a microalgae filtration system 10 according to any of the various disclosed embodiments. An influent or feed stream 20 including microalgae therein is fed via the inlet 110 to the filter housing 100 (e.g., into the internal volume V thereof). The influent 20 is generally an aqueous feed stream containing (primarily) water and microalgae suspended or otherwise distributed therein. The influent 20 can include further components depending on the source of the feed stream. For example, when the influent 20 is fed from an upstream bioreactor producing the microalgae as a product, the influent 20 can include other components from the bioreactor reaction medium, for example nutrients or other growth medium components for microalgae growth, metabolic byproducts from microalgae growth, etc. Similarly, when the influent 20 is fed from a natural body of water, the influent can include other components from the natural water source, for example bacteria or other microorganisms present in the aquatic environment, salt from a saltwater source, etc.

The influent or feed stream 20 travels through the internal volume V of the filter housing 100 and along the continuous fluid flow path 130 across the plurality of fungal filters 210 in the filtration system 10. As the microalgae-containing fluid passes through the filter housing 100, it contacts the capture fungus 230 of the fungal filters 210, whereupon the dispersed microalgae is captured by and bound to the capture fungus 230 as bound microalgae 232. The resulting structure in the filtration system 10 is a coated fungal filter 212, which corresponds to the original or fresh fungal filter 210 (i.e., free from microalgae), but further including bound microalgae 232 on the capture fungus 230.

After capture and removal of microalgae from the fluid passing through the filter housing 100 and contacting multiple fungal filter 210 stages, the resulting fluid is withdrawn from the filtration system 10 as an effluent or product stream 30. The effluent 30 is likewise generally an aqueous product stream containing (primarily) water, but it contains relatively less microalgae than the influent 20. In various embodiments, at least 70% of the microalgae in the influent 20 is captured by the fungal filters 210 when forming the corresponding coated fungal filters 212. For example, at least 70, 80, 90, or 95% and/or up to 90, 95, 98, 99, or 100% of the microalgae in the influent 20 is captured. Alternatively or additionally, the concentration of microalgae in the effluent 30 can be 30% or less than that in the influent 20. For example, the concentration of microalgae in the effluent 30 can be at least 1, 2, 5, or 10% and/or up to 5, 10, 20, or 30% of the concentration of microalgae in the influent 30.

The coated fungal filters 212 are removed from the filtration system 10 or from the filter housing 100 to harvest and recover the bound microalgae 232 thereon. The coated fungal filters 212 can be removed at any suitable time during operation of the filtration system 10, for example after sufficient bound microalgae 232 has accumulated on the capture fungus 230, in which case the overall capture and removal efficiency of the filtration system 10 might begin to decrease without removal and replacement of the coated fungal filters 212. A particular coated fungal filter 212 can be removed separately from or along with its corresponding modular filtration unit 200 as described above. Harvesting the bound microalgae 232 suitably includes scraping or otherwise mechanically removing the bound microalgae 232 from the perforated support 220. In an embodiment, the collective capture fungus 230 and bound microalgae 232 biomass on the fungal filter 212 can be removed together from the perforated support 220 during harvesting. The harvested biomass can be used as mixture of fungus and algae. For example, when capture fungi producing useful bioproducts are combined with oil-producing microalgae, the collective algae-fungi feedstocks harvested from the coated fungal filters 212 can be processed simultaneously for food, nutraceutical, and animal feed markets.

In an embodiment, the method further includes replacing the removed coated fungal filters 212 with fresh fungal filters 210. The fresh fungal filters 210 generally include a new or different perforated support 220 having a newly grown capture fungus 230 thereon which is suitably free from microalgae. Such fresh fungal filters 210 can be prepared from other coated fungal filters 212 that have been previously removed from the filtration system 10, harvested to remove and recover the capture fungus 230 and bound microalgae 232, sterilized, and then incubated in a culture medium 300 to re-grow a new capture fungus 230 on the support 220. In some embodiments, removing the coated fungal filters 212 and replacing them with fresh fungal filters 210 can be performed while the filtration system 10 is still in operation. For example, in the embodiments illustrated in FIGS. 3 and 7, removal of a single modular filtration unit 200 with a coated fungal filter 212 for replacement can be performed while influent 20 continues to pass through the filtration system 10 and microalgae is captured on the other modular filtration unit 200 still inserted in the filter housing 100. In some embodiments, removal of a coated fungal filter 212 can be performed while the filtration system 10 is temporarily halted, for example halting influent flow when changing filters, such as when disassembly and reassembly is required to remove and replace a filter.

Flow of the process fluid through the filtration system 10 can be driven by any suitable means, for example by gravity, an external pressure source, or a combination thereof. In some embodiments, gravity alone can be a sufficient driving force for flow through the filter housing 100 (i.e., with the inlet 110 at a higher relative elevation than the outlet 120), in particular because large velocities are not required for effective operation of the filtration system 10. Lower velocities can promote extended contact time and capture efficiency between the influent 20 and the capture fungus 230, and they also limit fluid shearing forces that can detach or otherwise damage a capture fungus 230 attached to its support 220. Nonetheless, in some embodiments, positive pressure or a suction pressure (e.g., via a pump or otherwise) can be used to assist flow through the filtration system 10, in particular if care is taken to limit or prevent damage to the capture fungus 230.

Further features and embodiments of the disclosed apparatus and methods are illustrated in specific figures and described in more detail below.

FIG. 1 illustrates an embodiment of a modular filtration unit 200 according to the disclosure. The modular filtration unit 200 has a screw design to increase the ease of setup of the filter system. It utilizes a stacking system where fungal filters 210 (not illustrated in FIG. 1) can be inserted into filtration units 200 that can be connected with each other through the use of threads 242A, 242B just like a screw. As illustrated, the top of the filtration unit 200 includes a threaded portion 242A that is complementary to an interior threaded receiving portion 242B (internal location denoted by dashed lines) at the base of the filtration unit. The top of the filtration unit 200 further includes a surface or recess 244 where the fungal filter 210 is positioned and seated (e.g., via locator slots 246 and complementary pins (not shown)) and then fixed in position once another modular filtration unit 200 is connected/screwed on top. The illustrated modular filtration unit 200 was fabricated from polylactic acid via 3D printing.

Figure 2:
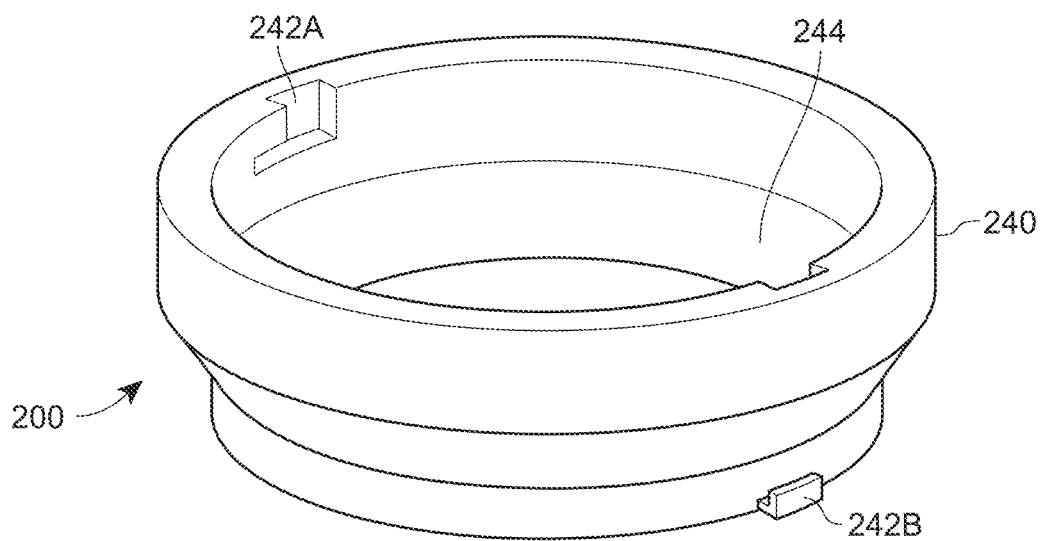
FIG. 2 illustrates another embodiment of a modular filtration unit according to the disclosure.

FIG. 2 illustrates another embodiment of a modular filtration unit 200 according to the disclosure. The modular filtration unit 200 has a funnel design to eliminate leaking of microalgae solution on the sides of the fungal filters 210 (not illustrated in FIG. 2), by incorporating a funnel structure or surface 244 at the bottom of the unit to ensure the solution that was filtered was applied towards the center of the fungal filter 210 in the unit below it. This modular filtration unit 200 design also includes slots 242A (illustrated at the top of the unit) that can be used to screw in and secure taller stacks of pods or filtration units 200 via complementary extruding or outwardly extending pins 242B (illustrated at the bottom of the unit). Each filtration unit 200 is designed to accommodate a fungal filter 210, which sits on a supporting mesh plate at the top of the funnel, for example at or on the surface 244. The illustrated modular filtration unit 200 was fabricated from polylactic acid via 3D printing.

FIG. 3 illustrates an embodiment of a filtration system 10 according to the disclosure. Panel (A) illustrates a cabinet design for the filter housing 100, which was designed for prolonged use and ease of fungal filter 210 removal and replacement, for example via removal and replacement of one or more corresponding modular filtration units 200A-200E from a plurality of filtration units 200 each including a fungal filter 210. A main factor for consideration during prolonged use is oversaturation of the fungal filter 210 over time, which leads to the need for the filter 210 to be replaced in order to continue operations. The cabinet design also facilitates proper alignment of the fungal filter 210 stack within the filter housing, which can otherwise be difficult in a cylindrical column. A series of slots 140 on the external surface 142 of the housing 100 cabinet provides access for insertion of new fungal filters 210 and removal of algae-coated fungal filters 212 after extended use. Openings at the top and bottom of the housing 100 cabinet (not shown) provide an inlet 110 and an outlet 120 for movement of fluid through the apparatus via a continuous flow path 130. Panel (B) illustrates a modular filtration unit 200 and corresponding fungal filter 210 as a drawer structure that can be slidably inserted and removed from the various stacking locations within the cabinet. The illustrated drawer filtration unit 200 embodiment has a perforated support 220 with 6.35 mm-diameter holes or open areas 224 spaced every 12.7 mm on the solid surface 222 of the support 220 to allow for filtration and fluid through-flow. Two 6.35 mm-diameter cylinders or alignment/sliding means 226 run the length of the drawer, and these cylinders 226 have a complementary matching or receiving cylinder set (not shown) inside the cabinet which acts as a track for the drawer to facilitate insertion, removal, and alignment of a given filtration unit 200 when its corresponding coated fungal filter 212 is in need replacement.

Figure 4:
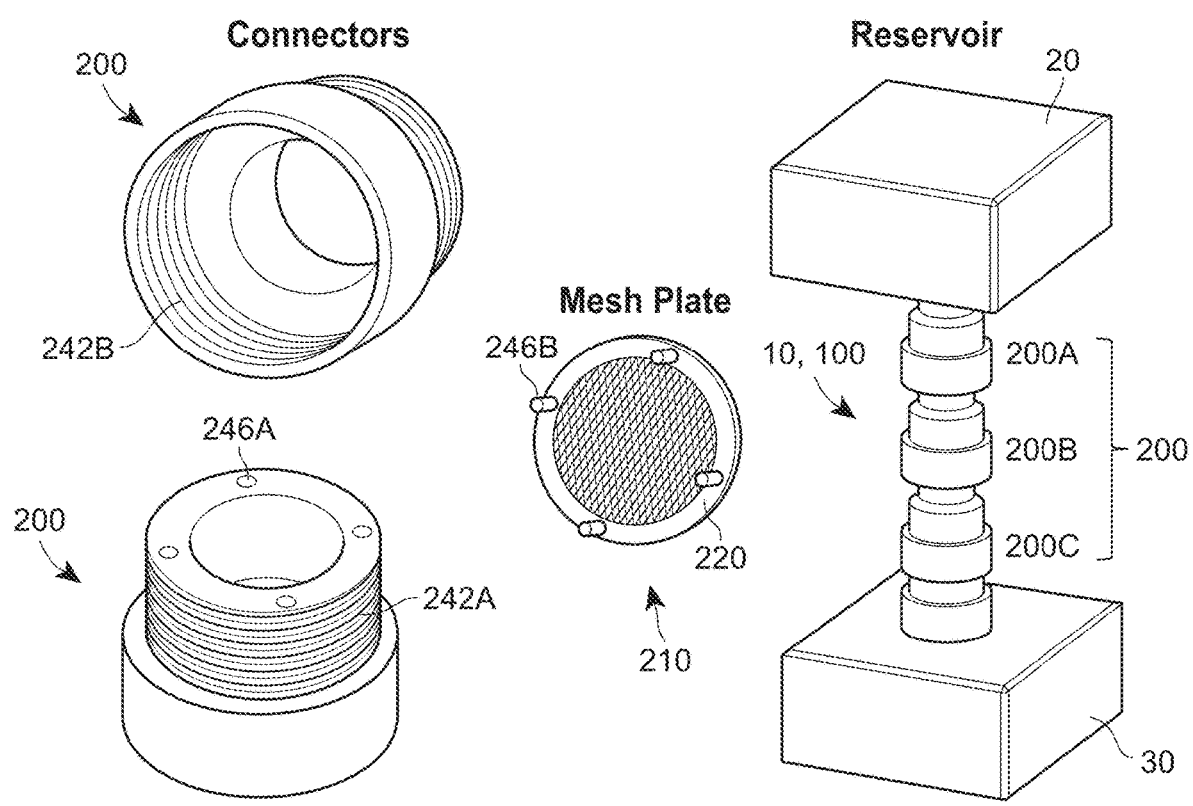
FIG. 4 illustrates another embodiment of a modular filtration unit according to the disclosure.
Figure 5:
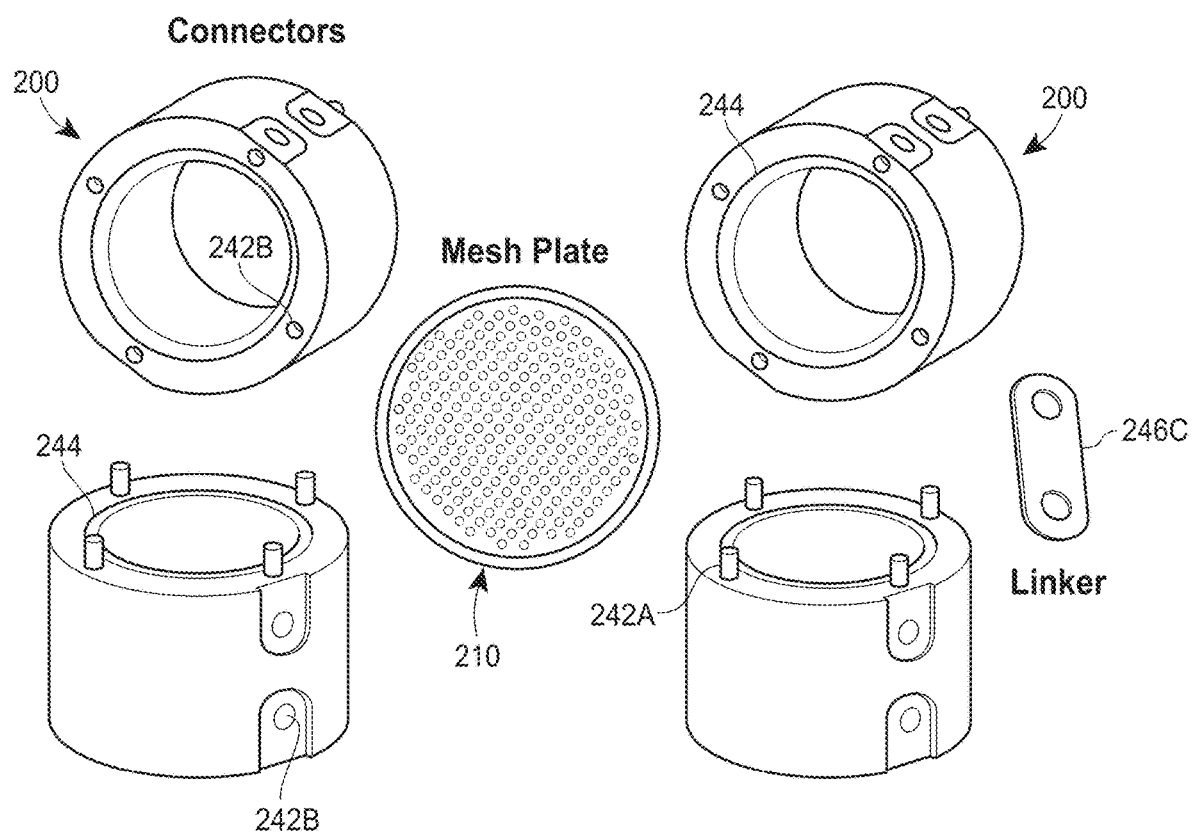
FIG. 5 illustrates another embodiment of a modular filtration unit according to the disclosure.
Figure 6:
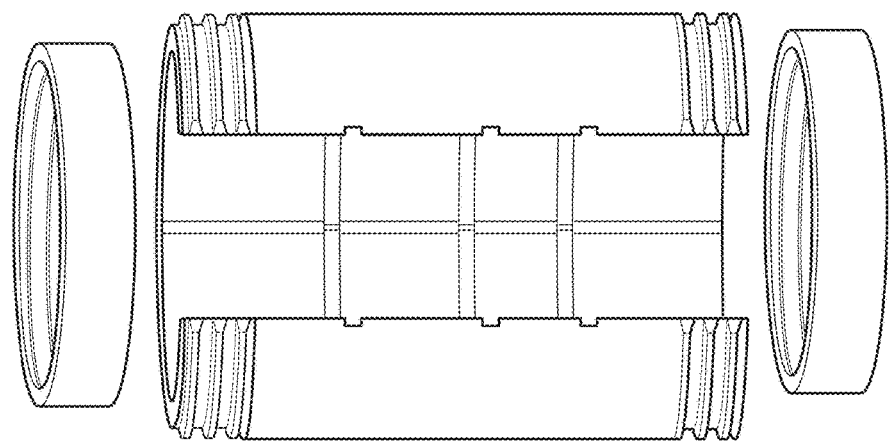
FIG. 6 illustrates another embodiment of a modular filtration unit according to the disclosure.
Figure 6:
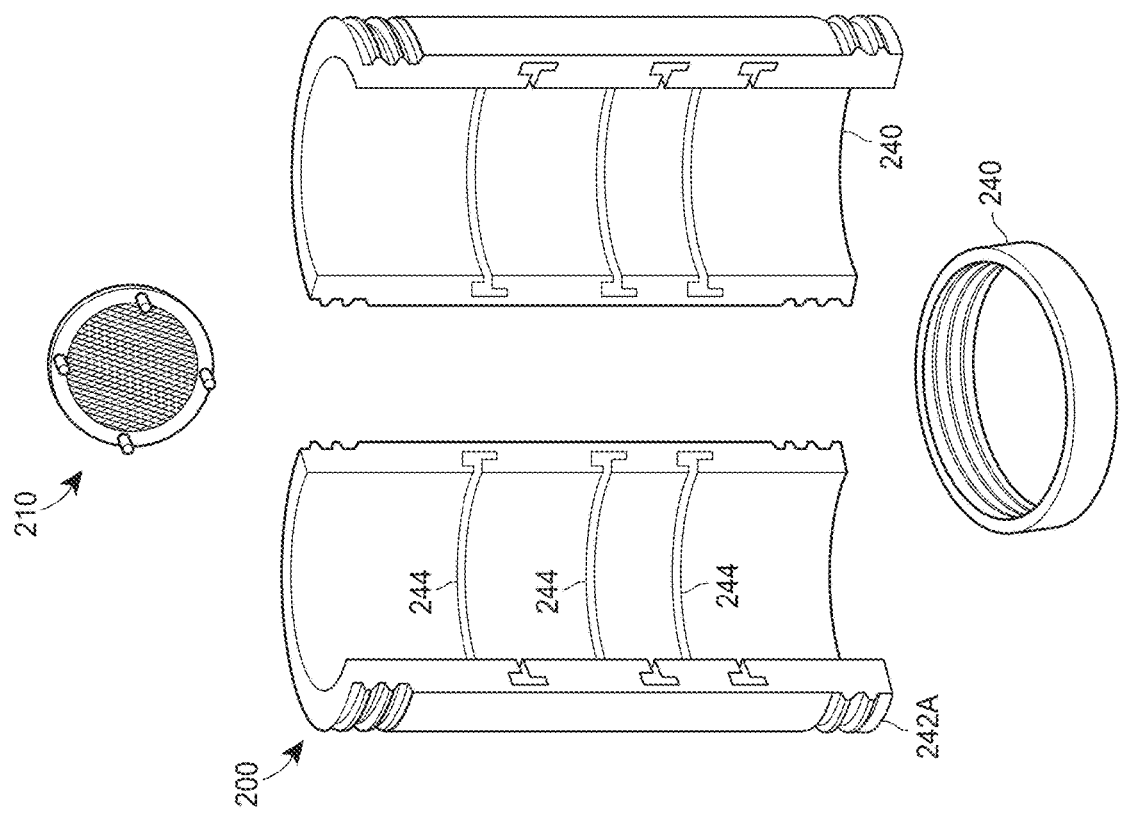

FIGS. 4-6 illustrate further embodiments of a modular filtration unit 200 according to the disclosure. FIG. 4 illustrates a modular filtration unit similar 200 to that of FIG. 1 with threaded screw connectors 242A, 242B. The mesh plate or perforated support 220 of the fungal filter 210 includes pins 246B for positioning, seating, and alignment in receiving holes 246A at the top of the filtration unit 200. The right side of the figure illustrates multiple modular filtration units 200A-200C stacked together to form a multistage filtration system 10, further including top and bottom reservoirs for holding influent 20 and collecting effluent 30, respectively. FIG. 5 illustrates stackable modular filtration units 200 similar to those of FIG. 4. Instead of threaded screw connectors, however, pins 242A and receiving holes 242B are used to position, align, and connect consecutive filtration units 200, and corresponding linkers 246C (shown as a bracket with two holes for screws, etc.) can be used to fasten adjacent filtration units 200, for example via additional receiving holes 242B on an outer surface of the units 200 as shown. A recess 244 in the filtration unit receives the mesh plate fungal filter 210, which is seated and fixed in place when the linkers 246C are attached. FIG. 6 illustrates a modular filtration unit 200 that houses multiple fungal filters 210. Two shell housing unit pieces 240 contain multiple complementary recess or groove sets 244 for receiving mesh plate fungal filters 210 (only one of which is shown in FIG. 6), and threaded connectors 242A at the top and bottom can be used to seal the filtration unit 200 (e.g., via a threaded ring as illustrated) and/or connect it to adjacent filtration units (not shown).

FIG. 7 illustrates a side cross-sectional view of an embodiment of a filtration system 10 similar to that shown in FIG. 3. The filter housing 100 has a cabinet design and the corresponding modular filtration unit 200/fungal filter 210 has a drawer design. The plurality of modular filtration units 200 is illustrated as including individual modular filtration units 200A-200D. A series of slots 140 on both the external surface 142 of and within the housing 100 cabinet provides access for insertion of new fungal filters 210 and removal of coated fungal filters 212 after extended use. For example, FIG. 7 illustrates the sliding removal of the modular filtration unit 200D which has a coated fungal filter 212 with accumulated bound microalgae 232 on the capture fungus 230. After removal of the filtration unit 200D, the combined fungus 230 and microalgae 232 biomass can be harvested and removed from the perforated support 220 of the filtration unit 200D. While the filtration unit 200D is removed, the filtration system 10 can continue to operate as the influent 20 being fed via the inlet 110 still passes through the filtration units 200A-200C, where microalgae can still be captured as bound microalgae 232 to provide the corresponding effluent 30 with reduced microalgae content withdrawn via the outlet 120. While the removed filtration unit 200D is being processed as part of the harvesting and optional fungal re-growth steps, a replacement filtration unit 200D with a fresh fungal filter 210 can be inserted into the housing 100 so that operation of the filtration system 10 can continue with its normal complement of filtration units 200 (e.g., four units 200A-200D in the illustrated embodiment). In cases where the effluent 30 still contains a substantial amount of uncaptured microalgae, all or at least a portion of the effluent 30 can be further processed for microalgae removal, for example by recycling all or at least a portion of the effluent 30 to the inlet 110 of the filtration system 10, or by feeding all or at least a portion of the effluent 30 to the inlet of a second filtration system (not shown) in a downstream serial relationship to the illustrated filtration system 10.

As shown in FIG. 7, the filtration system 10 can include further components to assist with process flow control and/or monitoring. For example, a flow rate meter 252 can be used to measure and control total flow rate through and retention time within the filtration system, for example with a corresponding valve in addition to or incorporated in the meter 252. Sensors 254 and 256 can be positioned at various locations on the filter housing 100 so that they can monitor (e.g., in real time) conditions within the internal volume V of the filter housing 100. For example, an optical meter 254 can be used to measure cell density or concentration of microalgae suspended in the fluid within the internal volume V. When positioned at various locations of the filter housing 100, such optical meters 254 can provide information related to microalgae concentration gradients and/or separation/capture efficiency within the filtration system 10. Alternative or additionally, a camera 256 can be used to observe the surface of a fungal filter 210 and detect the accumulation over time of bound microalgae 232 on the capture fungus 230, which in turn provides information regarding a relative degree of filter saturation and timing for removal, harvesting, and replacement of a given filtration unit 200/fungal filter 210. More than one camera 256 can be used, for example to provide multiple views of a single filter and/or views of different filters to determine a filter-specific timing for removal, harvesting, and replacement.

Figure 8:
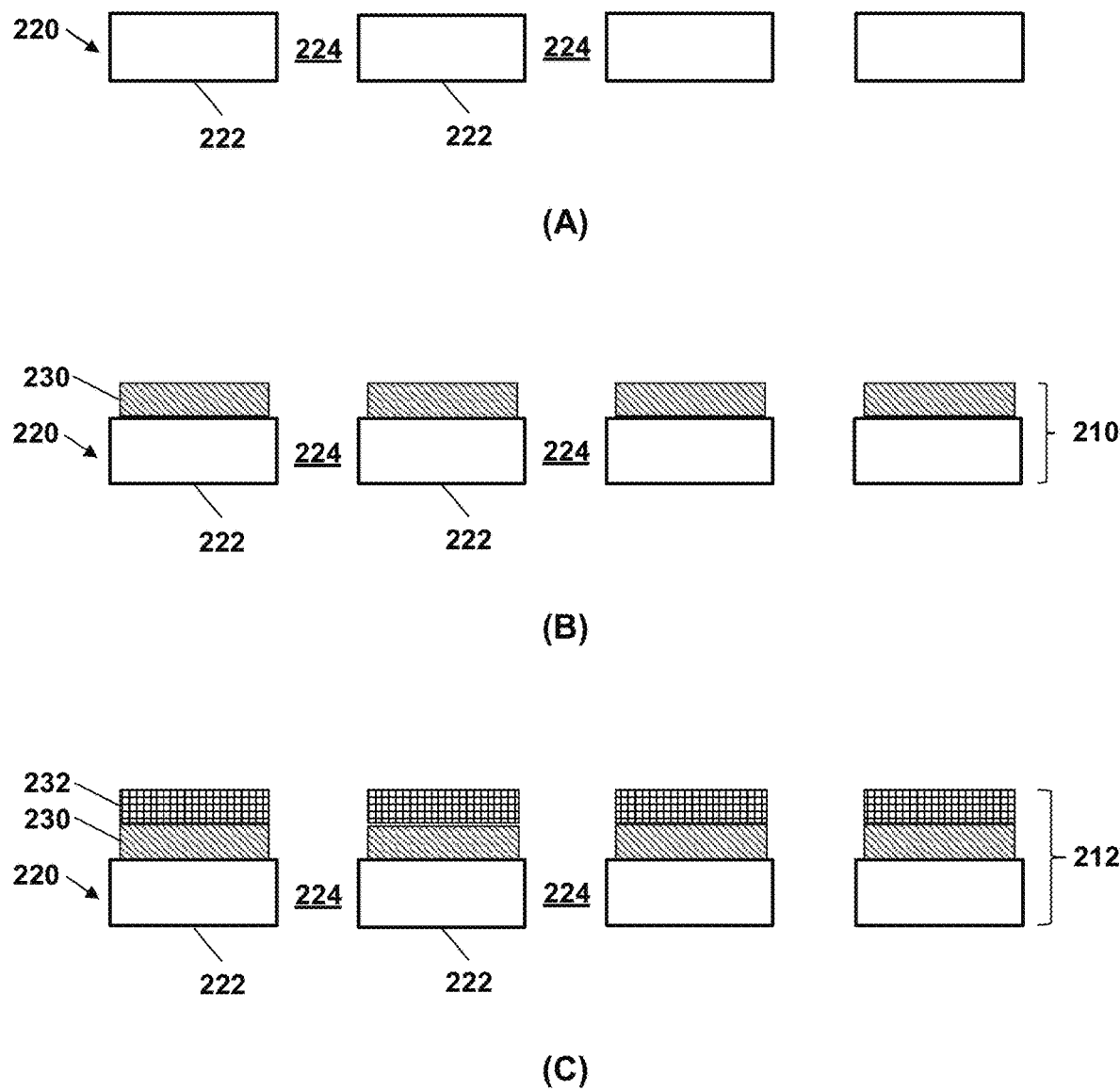
FIG. 8 illustrates side cross sectional views of perforated supports according to the disclosure, including (A) a perforated support prior to binding a capture fungus thereto and/or after harvesting microalgae therefrom, (B) a perforated support with capture fungus thereon in the form of a fungal filter, and (C) a perforated support with capture fungus and microalgae thereon in the form of a coated fungal filter.

FIG. 8 illustrates side cross sectional views of perforated supports 220 according to the disclosure. Panel (A) illustrates a perforated support 220 prior to binding a capture fungus 230 thereto and/or after harvesting fungus 230/microalgae 232 therefrom. Panel (B) illustrates a perforated support 220 with capture fungus 230 thereon in the form of a fungal filter 210, for example a fresh fungal filter 210 with newly re-grown fungus 230 that is ready for re-insertion and use in a filtration system 10. Although the figure illustrates the capture fungus 230 grown only on a single (top) surface of the support 220, the fungus 230 more generally can grow on and attach to any available surface of the support 220 (e.g., top, sides, bottom). Panel (C) illustrates a perforated support 220 with capture fungus 230 and bound microalgae 232 thereon in the form of a coated fungal filter 212. Once sufficient bound microalgae 232 has accumulated on the capture fungus 230, the coated fungal filter 212 can be remove from the filtration system 10, and the collective fungus 230/microalgae 232 biomass can be harvested therefrom, which in turn results in the structure illustrated in panel (A) (i.e., a bare perforated support 220 that can be sterilized and then have new fungus 230 re-grown thereon).

U.S. Publication No. 2018/0346954 provides disclosure related to various fungi and algae that can be used as the capture fungus and corresponding microalgae in the disclosed filtration system, and it is incorporated herein by reference in its entirety.

A variety of fungi can be employed as the capture fungus for the fungal filter. In some embodiments, a single type (e.g., genus or species) of fungus is used as the capture fungus for the fungal filter. In other embodiments, multiple types (e.g., genus or species) of fungi are used as the capture fungus for the fungal filter, for example including blends or mixtures of fungi on a single perforated support or including different types of fungi on different perforated supports in a filtration system. In some cases, the fungus can be a basidiomyccte, ascomycete, or zygomycete. For example, one or more fungi can be a member of a genus such as: *Aspergillus, Blakeslea, Botrytis, Candida, Cercospora, Cryptococcus, Cunninghamella, Fusarium (Gibberella), Kluyveromyces, Lipomyces, Morchella, Mortierella, Mucor, Neurospora, Penicillium, Phycomyces, Pichia (Hansenula), Puccinia, Pythium, Rhodosporidium, Rhodotorula, Saccharomyces, Sclerotium, Trichoderma, Trichosporon, Xanthophyllomyces (Phqffia)*, or *Yarrowia*. For example, the fungus can be a species such as: *Aspergillus terreus, Aspergillus nidulans, Aspergillus niger, Atractiella* PMI152, *Blakeslea trispora, Botrytis cinerea, Candida japonica, Candida pulcherrima, Candida revkaufi, Candida tropicalis, Candida utilis, Cercospora nicotianae, Clavulina* PM1390, *Cryptococcus curvatus, Cunninghamella echinulata, Cunninghamella elegans, Flagelloscypha* PM1526, *Fusarium fujikuroi (Gibberella zeae), Grifola frondosa* GMNB41, *Kluyveronmyces lactis, Lecythophora* PM1546, *Leptodontidium* PMI413, *Lachnum* PM1789, *Lipomyces starkeyi, Lipomyces lipoferus, Mortierella alpina, Mortierella elongata* AG77, *Mortierella gamsii* GBAus22, *Mortierella ramanniana, Mortierella isabellina, Mortierella vinacea, Mucor circinelloides, Neurospora crassa, Phycomyces blakesleanus, Pichia pastoris, Puccinia distincta, Pythium irregulare, Rhodosporidium toruloides, Rhodotorula glutinis, Rhodotorula graminis, Rhodolorula mucilaginosa, Rhodolorula pinicola, Rhodotorula gracilis, Saccharomyces cerevisiae, Sclerotium rolfsii, Trichodenna reesei, Trichosporon cutaneum, Trichosporon pullans, Umbelopsis* PMI120, *Xanthophyllomyces dendrorhous (Phqffia rhodozyma), Yarrowia lipolytica*, or a combination thereof. In some cases, the fungus is not *Geosiphon pyriformis*.

In some cases, the fungus employed is a multi-celled fungi. For example, the fungus employed can have tissues and/or structures such as hyphae. Many fungi is made up of fine, branching, usually colorless threads called hyphae. Each fungus can have vast numbers of these hyphae, all intertwining to make up a tangled web called the mycelium. The mycelium is generally too fine to be seen by the naked eye, except where the hyphae are very closely packed together. However, in some cases the fungus need not be a multi-celled fungus. For example, the fungus can be a one-celled organism such as a yeast.

In some cases, the fungus can be one or more of *Mortierella elongata, Mortierella elongata* AG77, *Mortierella gamsii, Mortierella gamsii* GBAus22, *Umbelopsis* sp., *Umbelopsis* PM1120, *Lecythophora* sp., *Lecythophora* PM1546, *Leptodontidium* sp., *Leptodontidium* PM1413, *Lachnum* sp., *Lachnum* PM1789, *Morchella* sp., *Saccharomyces cerevisiae, Atractiella* sp., *Atractiella* PMI152, *Clavulina, Clavulina* PM1390, *Grifola frondosa, Grifola frondosa* GMNB41, *Flagelloscypha* sp., *Flagelloscypha* PM1526, and combinations thereof.

The capture fungus can be bound or otherwise adhered to the perforated support by any suitable means to form the corresponding fungal filter. Suitably, the perforated support can be immersed in a fungal growth medium, as the capture fungus is generally capable of attaching/adhering to most solid surfaces during fungal filter formation/growth. The capture fungi can form dense biofilms along culture surfaces, growing into the size and shape of their incubation container to adhere to the perforated support and form the fungal filter. Suitable growth or culture medium for the capture fungus is not particularly limited and can be selected by the skilled artisan. For example, the capture fungus can be cultured in a culture medium that contains some carbohydrate, such as some sugar. The sugar can be any convenient sugar or a combination of sugars. Examples include dextrose, sucrose, glucose, fructose or a combination thereof. The amount of sugar can be included in amounts of about 1 g/liter to about 20 g/liter, or of about 3 g/liter to about 18 g/liter, or of about 5 g/liter to about 15 g/liter. In an embodiment, the capture fungus can be grown in potato dextrose broth (PDB) media (12 g/L potato dextrose broth, 5 g/L yeast extract, pH 5.3). FIG. 9 illustrates this process in which an initially uncoated or otherwise fungus-free perforated support 220 (left side of FIG. 9; see also panel (A) of FIG. 8) is placed or immersed in a fungal growth or culture medium 300 that contains floating or suspended fungal mycelia 310 of the desired capture fungus. As the culture medium 300 with immersed supports 220 therein is incubated, capture fungus 230 grows and adheres to the solid surfaces 222 of the perforated support 220. The right side of FIG. 9 shows the corresponding fungal filter 210 including the perforated support 220 with the capture fungus 230 thereon (see also panel (B) of FIG. 8). After sufficient growth and accumulation of capture fungus 230, the fungal filter 210 is removed from the culture medium 300 and can be inserted or otherwise installed into a filtration system 10, for example as a fungal filter 210 replacing a coated fungal filter 212 (see panel (C) of FIG. 8) to be removed and harvested.

A variety of microalgae in an aqueous feed can be captured by and bound to the capture fungus during use of the filtration system. Examples of microalgae genera that are particularly suitable for capture and harvest using the filtration system include *Nannochloropsis, Chlorella*, and *Chlamydomonas*. Depending on the source of the influent, the aqueous feed to the filtration system can include a single type of microalgae or multiple types of microalgae. For example, an influent can be obtained from a bioreactor, which could be operated to produce a single type of desired microalgae that is then captured and harvested using the filtration system. In other embodiments, a bioreactor could also be operated to produce a desired blend of different types of microalgae (e.g., based on production of different desired metabolic or biomass products) that are then captured and harvested using the filtration system. In other embodiments, the influent can be obtained from a natural water source where microalgae are present, for example freshwater or saltwater marine environments, such a pond, lake, river, estuary, gulf, sea, ocean, etc. In such cases, the natural water source can include any of a variety of microalgae present in the environment, which microalgae are then captured and harvested using the filtration system.

Examples suitable algae include diatoms (bacillariophytes), green algae (chlorophytes), blue-green algae (cyanophytes), and golden-brown algae (chrysophytes). In addition, a fifth group known as haptophytes may be used. Specific non-limiting examples of bacillariophytes capable of lipid production include the genera *Amphipleura, Amphora, Chaetoceros, Cyclotella, Cymbella, Fragilaria, Hantzschia, Navicula, Nitzschia, Phaeodactylum,* and *Thalassiosira.* Specific non-limiting examples of chlorophytes capable of lipid production include *Ankistrodesmus, Botryococcus, Chlorella, Chlorococcum, Dunaliella, Monoraphidium, Oocystis, Scenedesmnus,* and *Tetraselmis.* In one aspect, the chlorophytes can be *Chlorella* or *Dunaliella.* Specific non-limiting examples of cyanophytes capable of lipid production include *Oscillatoria* and *Synechococcus.* A specific example of chrysophytes capable of lipid production includes *Boekelovia.* Specific non-limiting examples of haptophytes include lsochrysis and *Pleurochrysis.* In some cases, an alkenone-producing alga, for example, a species of the lsochrysis family which includes, but not limited to, lsochrysis galbana, lsochrysis sp. T-Iso, and lsochrysis sp. C-Iso can be employed. Other examples of alkenone-producing algae include Emiliania huxleyi and Gephyrocapsa oceanica. In some cases, the algae is not a cyanobacterium. For example, the algae may not, in some cases, be *Nostoc punctiforme.*

Further examples of algae can be species of *Amphipleura, Amphora, Aquamortierella, Chaetoceros, Charophyceae, Chlorodendrophyceae, Chlorokybophyceae, Chlorophyceae, Coleochaetophyceae, Cyclotella, Cymbella, Dissophora, Embryophytes, Endogaceae, Fragilaria, Gamsiella, Hantzschia, Klebsormidiophyceae, Lobosporangium, Mamiellophyceae, Mesostigmatophyceae, Modicella, Mortierella, Mucor, Navicula, Nephroselmidophyceae, Nitzschia, Palmophyllales, Prasinococcales, Prasinophytes, Pedinophyceae, Phaeodactylum, Pyramimonadales, Pycnoccaceae, Pythium, Phytophthora, Phytopythium, Rhizopus, Thalassiosira, Trebouxiophyceae, Ulvophyceae, Zygnematophyceae,* or a combination thereof.

In some cases, the algae is a photosynthetic algae. For example, the alga type employed can be a strain of *Nannochloropsis oceanica*, for example *Nannochloropsis oceanica* CCMP1779.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

PARTS LIST 10 microalgae filtration system
20 influent/feed source
30 effluent/product stream
100 filter housing (internal volume V)
110 filter housing inlet
120 filter housing outlet
130 continuous fluid flow path
140 opening or slot
142 external surface (external region E)
200 modular filtration units (e.g., 200A, 200B, 200C, . . . )
210 fungal filter
212 coated fungal filter
220 perforated support
222 perforated support solid surface
224 perforated support open area(s)
226 alignment/sliding means such as complementary track components
230 (capture) fungus
232 microalgae bound to (capture) fungus
240 modular housing unit
242 connection means for modular housing unit(s) such as threads, slots, pins, etc. (e.g., 242A, 242B, . . . )
244 surface or recess
246 locating/positioning/seating means for fungal filter(s) such as slots, pins, etc. (e.g., 246A, 246B, . . . )
252 flow rate meter and optional valve or flow controller
254 sensor/optical cell density meter
256 sensor/filter saturation camera
300 culture/fungal growth medium
310 floating/suspended fungal mycelia

What is claimed is:

1. A microalgae filtration system comprising:
a filter housing having an inlet and an outlet, and comprising a plurality of modular filtration units defining a continuous fluid flow path from the inlet, through the modular filtration units, and to the outlet;
wherein:
each modular filtration unit comprises a fungal filter comprising (i) a perforated support having a solid surface and defining an open area, and (ii) a capture fungus on the solid surface of the perforated support;
the fungal filter is adapted to be removed and replaced from the modular filtration unit;
the continuous fluid flow path passes through the fungal filter; and
the capture fungus is adapted to capture one or more types of microalgae upon contact of the capture fungus with the microalgae.

2. The filtration system of claim 1, wherein the fungal filter is removably engaged with the modular filtration unit from an external region of the filter housing.

3. The filtration system of claim 1, wherein the modular filtration unit comprises a modular housing unit defining a portion of the filter housing and containing the fungal filter.

4. The filtration system of claim 1, wherein the perforated support comprises a mesh plate.

5. The filtration system of claim 1, wherein the perforated support has a ratio of open area to closed (solid surface) area in a range of 20:80 to 80:20.

6. The filtration system of claim 1, wherein the perforated support comprises a material selected from the group consisting of plastics, metals, and combinations thereof.

7. The filtration system of claim 1, wherein the capture fungus comprises a *Mortierella* fungus.

8. The filtration system of claim 1, wherein the microalgae capable of being captured upon contact with the capture fungus are selected from the group consisting of *Nannochloropsis, Chlorella, Chlamydomonas*, and combinations thereof.

9. A method for harvesting microalgae, the method comprising:
providing a filtration system according to claim 1;
feeding an influent comprising microalgae to the inlet of the filter housing;
capturing microalgae on one or more fungal filters in the filter housing, thereby forming one or more coated fungal filters comprising (i) the perforated support, (ii) the capture fungus thereon, and (iii) microalgae bound to the capture fungus;
withdrawing an effluent from the outlet of the filter housing, the effluent containing less microalgae than the influent; and
removing one or more coated fungal filters from the filtration system and harvesting the microalgae therefrom.

10. The method of claim 9, further comprising:
replacing the removed coated fungal filters with fresh fungal filters.

11. The method of claim 9, comprising performing feeding the influent, capturing the microalgae, and withdrawing the effluent as continuous process operations.

12. The method of claim 9, wherein at least 70% of the microalgae in the influent is captured on the fungal filters.

13. The method of claim 9, wherein the influent is a bioreactor product stream.

14. The method of claim 9, wherein the influent is from a natural body of water.

15. The method of claim 9, comprising feeding the influent and withdrawing the effluent via gravity.

16. The filtration system of claim 2, wherein:
each modular filtration unit is in the form a slidable drawer comprising the fungal filter as a component thereof; and
the filter housing comprises a plurality of externally accessible and internal slots, the slots (i) being adapted to receive the slidable drawers therein and (ii) being adapted to permit removal of the slidable drawers therefrom.

17. The filtration system of claim 3, wherein:
each modular housing unit is removably connected to and disconnectable from at least one adjacent modular housing unit; and
the filter housing is defined by a plurality of the modular housing units assembled together.

18. The filtration system of claim 1, further comprising:
at least one optical meter positioned and adapted to measure at least one of cell density and concentration of microalgae suspended in the fluid within an internal volume of the filter housing; and
at least one camera positioned and adapted to detect accumulation over time of bound microalgae on the capture fungus of at least one modular filtration unit in the filtration system.

19. The method of claim 9, further comprising, when at least one coated fungal filter has been removed from the filtration system and at least one fungal filter remains in the filter housing:
continuing to feed the influent to the inlet of the filter housing;
continuing to capture microalgae on the one or more fungal filters remaining in the filter housing; and
continuing to withdraw the effluent from the outlet of the filter housing.

* * * * *